(12) United States Patent
Keidar et al.

(10) Patent No.: US 8,483,388 B2
(45) Date of Patent: *Jul. 9, 2013

(54) DIGITAL VIDEO PROTECTION FOR AUTHENTICITY VERIFICATION

(75) Inventors: Oren Keidar, Ra'anana (IL); Ran Bar-Sella, Haifa (IL); Igal Dvir, Ra'anana (IL)

(73) Assignee: Nice-Systems Ltd., Raanana (IL)

( * ) Notice: Subject to any disclaimer, the term of this patent is extended or adjusted under 35 U.S.C. 154(b) by 153 days.

This patent is subject to a terminal disclaimer.

(21) Appl. No.: 13/039,341

(22) Filed: Mar. 3, 2011

(65) Prior Publication Data

US 2011/0261996 A1    Oct. 27, 2011

Related U.S. Application Data

(63) Continuation of application No. 10/474,380, filed as application No. PCT/IL02/00291 on Apr. 11, 2002, now Pat. No. 7,933,407.

(60) Provisional application No. 60/282,911, filed on Apr. 11, 2001.

(51) Int. Cl.
H04L 29/06    (2006.01)

(52) U.S. Cl.
USPC .......................................................... 380/200

(58) Field of Classification Search
None
See application file for complete search history.

(56) References Cited

U.S. PATENT DOCUMENTS

| | | | |
|---|---|---|---|
| 5,960,081 A | 9/1999 | Vyne et al. | |
| 6,009,176 A | 12/1999 | Gennaro et al. | |
| 6,209,092 B1 | 3/2001 | Linnartz | |
| 6,285,775 B1 | 9/2001 | Wu et al. | |
| 6,310,962 B1 | 10/2001 | Chung et al. | |
| 7,058,979 B1 | 6/2006 | Baudry et al. | |
| 2001/0021260 A1 | 9/2001 | Chund et al. | |
| 2004/0153648 A1 | 8/2004 | Rotholtz et al. | |

FOREIGN PATENT DOCUMENTS

| | | |
|---|---|---|
| EP | 0 926 897 | 6/1999 |
| EP | 0 944 256 | 9/1999 |
| EP | 0 952 728 | 10/1999 |

OTHER PUBLICATIONS

Steinder M et al.: "Progressively authenticated image transmission" Military Communications Conference Proceedings, IEEE Atlantic City, NJ, USA, 1999 vol. 1, pp. 641-645 Oct. 31, 1999 XP010369680.

(Continued)

*Primary Examiner* — Shaun Gregory
(74) *Attorney, Agent, or Firm* — Pearl Cohen Zedek Latzer, LLP

(57) ABSTRACT

A method for verifying the authenticity and integrity of an ordered sequence of digital video frames, without having access to the original recording, by embedding therein a respective series of digital signatures based on a secret key, or keys, and on the video content of respective frames. Signatures are camouflaged by embedding in transform coefficients of a transformed representation of the video data in parts of the frame corresponding to motion. If there is sufficient motion to contain all of the signature bits, a supplementary technique embeds in high-texture areas of a frame. A final fall-back is to embed in a pre-defined default zone. A method of predicting when supplementary embedding is needed enables the process to be applied in a single pass allowing real-time operation. Verification is done during decoding by comparing, for identity, embedded signatures with signatures calculated anew using the method employed to embed.

11 Claims, 9 Drawing Sheets

OTHER PUBLICATIONS

Supplemental European Search Report for Application No. EP 02 76 1951. Date of completion of the search Jul. 19, 2010.

Perceptual Watermarks for Digital Images and Video Raymond B. Wolfgang, Student Member, IEEE Christine I. Podilchuk, Member, IEEE and Eduard J. Delp, Fellow, IEEE Proceedings of the IEEE, vol. 87, No. 7, Jul. 1999.

Digital Watermarking of MPEG-2 coded video in the bitstream domain, in Proc. Int. Conference on Acoustics, Speech, and Signal Processing vol. 4, pp. 2621-2624, Munich Apr. 1997 Frank Hartung & Bernd Girod Telecommunications Institute, University of Erlangen-Nuremberg, Cauerstrasse 7, 91058 Erlangen, Germany.

H.263+: Video Coding at Low Bit Rates Guy Côté, Student Member IEEE, Berna Erol, Michael Gallant, Student Member, IEEE and Faouzi Kossentini, Member, IEEE IEEE Transactions on Circuits and Systems for Video Technology, vol. 8, No. 7, pp. 849-866, Nov. 1998.

ITU-T Telecommunication Standardization Sector of ITU. H-263, Recommendation, Geneva, Mar. 1996 Transmission of Non-Telephone Signals—Video Coding for Low Bit Rate Communication.

ITU-T Telecommunication Standardization Sector of ITU. H-263, recommendation, Geneva, Jan. 1995 Video coding for low bit rate communication. Series 8 Audiovisual and Multimedia Systems. Infrastructure of Audiovisual Services—Code of Moving Video.

International Search Report for International Application No. PCT/IL02/00291 Date of mailing Nov. 5, 2002.

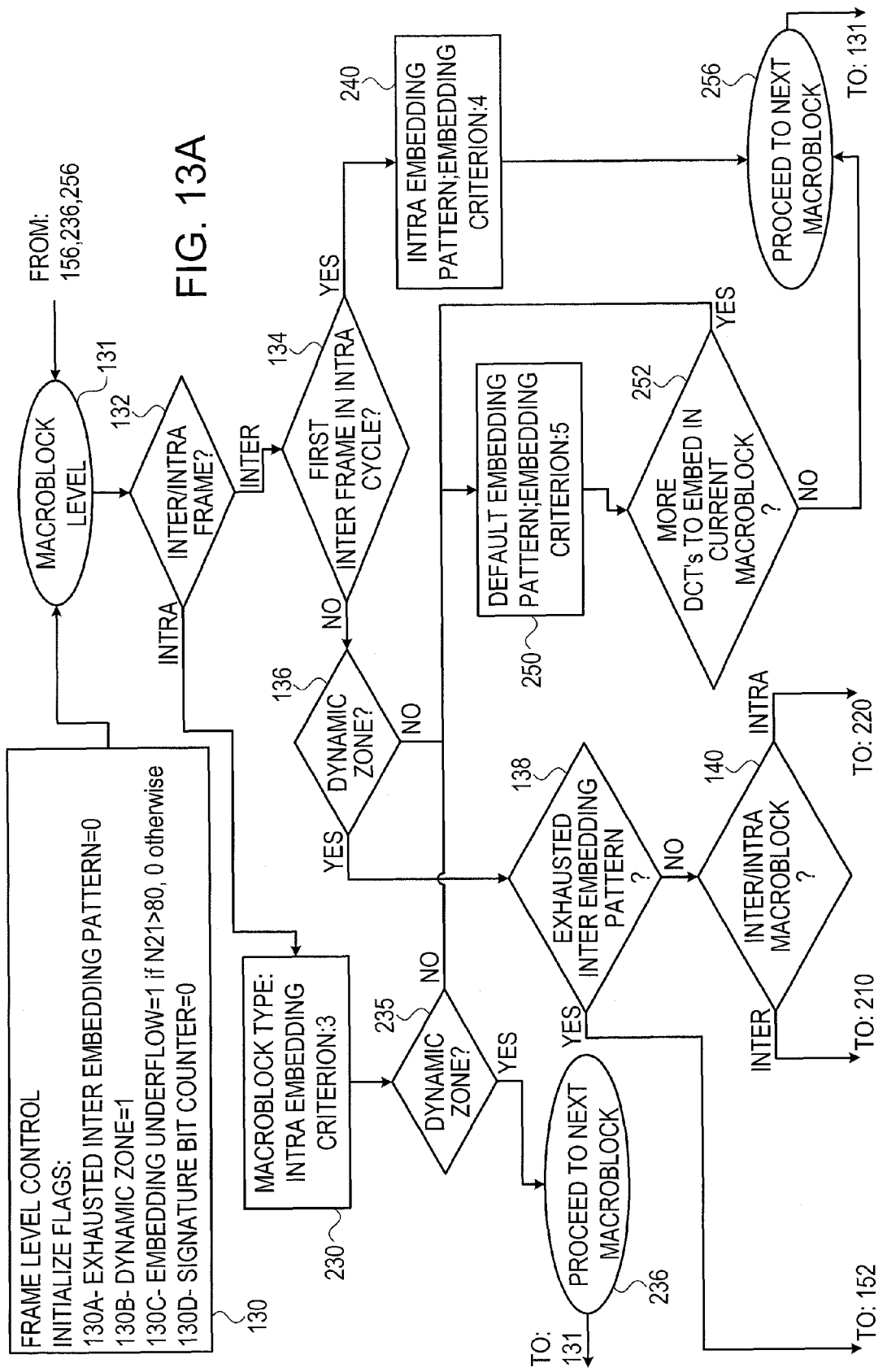

DIGITAL VIDEO PROTECTION FOR AUTHENTICITY VERIFICATION

This application is a continuation of U.S. patent application Ser. No. 10/474,380, filed Apr. 23, 2004, now U.S. Pat. No. 7,933,407 which is a National Phase application of PCT/IL2002/00291, filed Apr. 11, 2002, entitled "DIGITAL VIDEO PROTECTION FOR AUTHENTICITY PROTECTION" which in turn claims priority from provisional patent application No. 60/282,911, filed Apr. 11, 2001, all of which are incorporated by reference herein in their entirety.

FIELD AND BACKGROUND OF THE INVENTION

The present invention relates to digital video and, more particularly, to a means of incorporation therein and extracting hidden information for authenticity verification.

The widespread use of digital media for recording information has brought with it a need to be able to the authenticity of such records. It is well known that digital media are more susceptible to alteration and manipulation than any previously known medium.

Verification is particularly needed in courts of law, where such records may be tendered as evidence. A mechanism is therefore required to authenticate and verify information and to detect fabrication of, or tampering with evidence. Media tampering refers to any manipulation of media that modifies its content, e.g. image blurring or cropping, and frame elimination or reordering.

The present invention is concerned with recorded video from a variety of systems, such as security CCTV.

An example of such a system is the NICE-Vision® video recording system (NICE Systems Ltd., Ra'anana, Israel), which performs compression of analog video channels and digitally saves the compressed data (in accordance with the H.263+ standard) on disks that can be accessed and played back, as required.

Digital Watermarks

A watermark is an identifying piece of information (an author's signature, a company logo, etc).

Most prior art deals with digital watermarking, the incorporation of robust identifying information in a digital message or file that enables identification of the source of that message or file. A digital watermark is intended to maintain its identifiability, regardless of subsequent processing of the message data, and to be robust enough to survive at least to the point where the message, itself, becomes unusable. Digital watermarks are normally intended for copyright protection, whereby it is difficult for an attacker to remove or destroy the watermark without damaging the audio-visual content, even if the existence of the watermark or the watermarking method is known.

This is not the same as protection against media content modification, for which the requirements are different, and may even be contrary. Thus, it is desirable that any tampering with content alter the digital signature and thereby betray the tampering. Nevertheless, the art of digital watermarking can contribute useful concepts and techniques, such as finding suitable locations for hiding information.

Most approaches to media authentication are based on building a content-based digital signature, often called fragile watermarking. A requirement of fragile watermarking is that it be sensitive to alteration of the media. The problem is what to embed and to find suitable places to embed the watermark while maintaining low complexity and near-zero artifacts.

Various techniques used in watermarking for digital images and video are discussed by Raymond B. Wolfgang, Christine I. Podilchuk, and Edward J. Delp in *Perceptual watermarks for digital images and video* (*Proceedings of the IEEE*, vol. 87, no. 7, July 1999). This article reviews recent developments in digital watermarking of images and video, where the) watermarking schemes are designed to exploit properties of the human visual system to provide a transparent watermark. It is noted therein that watermarks inserted into the high (spatial) frequency parts of a picture are most vulnerable to attack, whereas watermarks in low-frequency areas are perceptually significant and sensitive to alterations. The article indicates important issues that must be taken into account when watermarking video sequences, such as frame shuffling, dependency between adjacent frames, etc.

Frank Hartung and Bernd Girod, discuss embedding of digital watermarking in MPEG-2 encoded video in the bit-stream domain (*Digital watermarking of MPEG-2 coded video in the bit-stream domain*, in *Proc. Int. Conference on Acoustics, Speech, and Signal Processing* vol. 4, pp 2621-2624, Munich, April 1997, which is incorporated by reference for all purposes as if fully set forth herein). Given an MPEG-2 bit-stream, the variable-length code (VLC) words representing Discrete Cosine Transform (DCT) coefficients are replaced by VLC code words that contain the watermark. The complexity is thereby much lower than the complexity of decoding watermarking in the pixel domain and re-encoding.

Vynne, Thorbjorn, Jordan, and Frederic discuss embedding of a digital signature in a digital video stream for watermarking purposes (Embedding a digital signature in a video sequence, U.S. Pat. No. 5,960,081, which is incorporated by reference for all purposes as if fully set forth herein), by embedding into the x- and y-coordinates of motion vectors. The method includes hybrid selection criteria to avoid objectionable visible artifacts and a method of avoiding problems that arise when fewer than 16 suitable picture blocks and/or vectors are available in a frame to embed the 32 bits of the signature. The system described was implemented on a CRAY T3D massively parallel supercomputer, where a near-real-time (5 frames per second) embedding of the signature was obtainable.

Overview of Video Compression

Video compression reduces the amount of data needed to represent a video sequence so as to enable faster and cheaper transmission through communication links as well as more efficient storage.

Video compression techniques achieve compression by taking advantage of statistical redundancies in video data, including:

Psycho-visual redundancy—reduced by color component interleaving;

Inter-frame temporal redundancy—reduced by motion compensation;

Inter-frame spatial redundancy—reduced by DCT transform and predictive coding; and Coding redundancy—reduced by entropy coding.

Some specific techniques for reducing redundancy are discussed below.

H.263+ Video Coding Standard

International standards for video compression include block-based compression standards such as MPEG-2 and H.263+, the standard used in the present invention. Generally, a specific standard can be applied using various algorithms. These compression standards are part of a wider grouping of transform-based compression standards. Other standards include the other MPEG-family embodiments as well as H.261 and other H.263-family embodiments.

The TMN-8 Video Codec—University of British Columbia, Canada H.263+ video codec is the preferred video compression method used in the present invention. This should not be taken to restrict the scope of the current invention.

ITU-T H.263+ (H.263+ in brief) is a low-bit-rate, video-coding standard used in applications, like video telephony and video conferencing, to provide adequate picture quality where communications channels limit transmission rates.

The description presented explicitly here suffices to provide an enabling disclosure of the present invention. Additional information about H.263+ may be found in: G. Cote, Erol B. Gallant, and F. Kossentini, *H.263+ Video coding at low bit rates, IEEE Transactions on circuits and systems for video technology*, vol 8, No 7, November 1998, and in *ITU-T H.263 Recommendation, Video coding for low bit rate communication*, Geneva, March 1996, both of which are incorporated by reference for all purposes as if fully set forth herein.

Visual information contained in a picture frame is represented at any point in the spatial domain by one luminance component, Y, and two chrominance components, $C_b$ and $C_r$. The luminance component of a picture is sampled at a specific resolution, specified by H.263+, while the chrominance components are relatively down-sampled by a factor of two in both horizontal and vertical directions. FIG. 1 depicts the spatial relationship of luminance and chrominance components (each chrominance dot represents two values, $C_b$ and $C_r$) in H.263+. It is seen that chrominance components are interleaved with the luminance components. Using one common $C_b$ sample and one common $C_r$ sample for every four Y samples, in this way, reduces psycho-visual redundancy.

Pixels of a digital video frame may be conveniently grouped into segments containing a plurality of pixels. Tracking segments between frames can considerably reduce calculation when members of a segment move together, so that all that is needed is to define a segment and a single motion vector that shows how the segment has moved between successive frames. An Inter segment is a segment, the location whereof is predicted from a previous frame; an Intra segment is a segment that is not so predicted.

In H.263+, each frame of an input video sequence is divided into macroblocks (the segments for this system), each consisting of four luminance (Y) blocks followed by a $C_b$ block and a $C_r$ block. Each block consists of 8 pixels×8 lines, as illustrated in FIG. 2.

The H.263+ standard supports inter-frame prediction based on motion estimation and compensation. Two coding modes are applied in the coding process:

Intra mode—where in a frame is encoded without regard to any preceding frame. Frames encoded in intra mode are called I-frames. The first frame in any sequence is encoded in intra mode and is called an Intra frame.

Inter mode—wherein predicted motion is employed to derive a succeeding frame from a preceding frame. Only prediction error frames are encoded i.e. the difference between an actual frame and the predicted frame thereof. Frames that are encoded in inter mode are called P-frames. Inter blocks and Inter macroblocks are respectively blocks and macroblocks, having a position thereof so predicted. A P-frame may also include Intra macroblocks, which are encoded the same as a macroblock in an I-frame.

A block-diagram representation of a typical H.263+ encoder is shown in FIG. 3A.

The first operation compares an incoming frame with an immediately preceding frame by subtracting (30 in FIG. 3) the latter from the former so that unchanged areas of the picture need not be encoded again, thereby saving bandwidth.

Motion Estimation and Compensation

Motion prediction is used to minimize temporal redundancy. A new current frame is predicted from an immediately preceding frame, by estimating where moving areas have moved to (motion estimation) and allowing for this movement (motion compensation). Each macroblock in a current frame is compared with a shifted macroblock from the previous frame to find the best match. The shift size is restricted to a predefined search area, called a search window. After finding the best match (the most similar macroblock), a motion vector or two components is all that is needed to represent the macroblock's displacement from the previous frame.

Frequency Domain Transform

The H.263+ encoder transforms pictures to a 'spatial frequency' domain by means of a Discrete Cosine Transform (DCT), in DCT module 32. The purpose is to minimize spatial redundancy by representing each 8×8 block by as few coefficients as possible. The DCT is particularly good at compacting the energy in a block of values into a small number of coefficients so that relatively few DCT coefficients are required to recreate a recognizable copy of the original block of pixels. For example, a blank homogeneous background can be represented by a single coefficient, the DC coefficient, whereas in the spatial domain, where each pixel is represented separately, the representation is clearly far less compact. The DCT is simple, efficient, and amenable to software and hardware implementation.

The DCT for an 8×8 block is defined by:

$$C_{m,n} = \alpha(m)\beta(n)\sum_{i=1}^{8}\sum_{j=1}^{8} B_{i,j}\cos\left(\frac{\pi(2i+1)m}{16}\right)\cos\left(\frac{\pi(2i+1)n}{16}\right),$$

$$0 \le m, n \le 7$$

where:

$$\alpha(0)=\beta(0)=\sqrt{1/8}$$

and:

$$\alpha(m)=\beta(n)=\sqrt{1/4} \text{ for } 1 \le m,n \le 7.$$

$B_{i,j}$ denotes the $(i,j)^{th}$ pixel in the 8×8 block and $C_{m,n}$ denotes the coefficient of the transformed block.

The inverse DCT (IDCT) for an 8×8 block is given by:

$$B_{i,j} = \sum_{m=1}^{8}\sum_{n=1}^{8} C_{m,n}\alpha(m)\cos\left(\frac{\pi(2m+1)i}{16}\right)\beta(n)\cos\left(\frac{\pi(2n+1)j}{16}\right),$$

$$0 \le i, j \le 7.$$

The DCT and IDCT are lossless, i.e. there is no loss of information when using perfect accuracy. In H.263+, however, the coefficients are quantized, i.e. stored as integers, by truncating the non-integer part of each, 33. Some information is lost thereby, which causes differences between original and reconstructed data.

The first coefficient in a block of DCT coefficients is the DC coefficient, which contains the average value of the pixels within the block. The other coefficients in the block (AC coefficients) represent the various 2D spatial frequencies. Since adjacent pixels usually carry values close to one another, it is to be expected that, in intra frames, the high-frequency coefficients will contain lower energy than low-frequency coefficients.

The advantage of the DCT over other frequency transforms is that the resultant matrix contains only real numbers, whereas other transforms (such as the Fast Fourier Transform) normally produce complex numbers. In addition to the simplicity of the DCT, it is efficient in implementation, both in software and in hardware.

Quantization and Inverse Quantization

The number of bits needed to represent visual information can be reduced by quantization. In H.263+, an irreversible function is applied in quantizer module 33, that provides the same output value for a range of input values. For a typical block of pixels, most of the coefficients produced by the DCT are close to zero. Quantizer module 33 reduces the precision of each DCT coefficient so that near-zero coefficients are set to zero and only a few significant non-zero coefficients are left. This is done in practice by dividing each coefficient by an integer scale factor and truncating the result. It is important to realize that the quantizer "throws away" information because coefficients that become zero through quantization will remain zero upon inverse quantization; therefore the compression is lossy. In H.263+, a single quantization value is used within a macroblock.

After inverse quantization in inverse quantizer module 34, and a subsequent IDCT process in inverse DCT module 36, the encoder holds a reconstructed frame in a memory 38 and the prediction process ensues.

Entropy Coding

Entropy coding encodes a given set of symbols with the minimum number of bits required to represent them. A priori statistics is used for allocating shorter code words to coefficients and motion vectors that have higher probability of occurrence, and longer codes for infrequently occurring values. For example, the zero-motion vector (0,0) is coded as a one-bit word, since it is very likely to appear. This increases coding efficiency and provides lossless compression as the decompression process regenerates the data completely.

Before applying entropy coding, the quantized DCT coefficients of a macroblock are rearranged from an 8×8 matrix into a one-dimensional array. In H.263+ among others, this is done by scanning the matrix diagonally in zig-zag fashion, as shown in FIG. 4. This rearranges the coefficients according to spatial frequency, from lowest frequency (DC) to highest. The array is encoded using run-length coding (RLC) triplets: (LAST, RUN, LEVEL), each triplet being known as an RLC event. The symbol RUN is defined as the distance between two non-zero coefficients in the array. The symbol LEVEL is the value of an non-zero coefficient that follows a sequence of zeroes. If LAST=1, the current RLC event corresponds to the last coefficient of the current block.

Rearranging the coefficients in zig-zag order achieves greater compactness when representing the coefficients as RLC events. In Intra frames it is obvious, since most of the energy is found at low spatial frequencies, that arranging the coefficients in zig-zag order produces longer sequences of zeroes, which decreases the number of RLC events, thereby achieving better compression.

H.263+ Decoding

A standard H.263+ decoder is essentially the inverse of an H.263+ encoder, and is illustrated in FIG. 3B. In brief, the main functions are:

Entropy Decoding

The variable-length codes that make up the H.263+ bitstream are decoded 301 in order to extract the coefficient values and motion-vector information.

Inverse Quantization

This reverses 302 the quantization performed in the encoder. The coefficients are multiplied by the same scaling factor that was used in quantizer 33 but, because quantizer 33 discarded the fractional remainder, the restored coefficients are not identical to the original coefficients, and this accounts for the lossiness of the process.

Inverse Discrete Cosine Transform

Inverse Discrete Cosine Transform (IDCT) 303 reverses DCT operation 32 to create a block of samples that typically correspond to the difference values that were produced by motion compensator 38 in the encoder.

Motion Compensation

The difference values are added to a reconstructed area from the previous frame to compensate for those macroblocks that have moved since the previous frame 305 and other changes, such as light intensity and color, 304. The motion vector information is used to pick the correct area (the same reference area that was used in the encoder). The result is a reconstruction of the original frame that, as already noted, will not be identical to the original because of the "lossy" quantization stage, i.e. image quality will be poorer than the original. The reconstructed frame is placed in a frame store 306 and it is used to motion-compensate the next received frame.

Data Encryption Standard

Among the various possible encryption algorithms, the Data Encryption Standard (DES) specifies one of the most widely used encryption systems. The standard provides a mathematical algorithm for encryption and decryption of blocks of data consisting of 64 bits under control of a 56-bit key. (Actually, the key consists of 64 binary digits of which 56 bits are randomly generated and used directly by the algorithm. The remaining 8 bits, which are not used by the algorithm, are used for error detection.)

Only the properties and interface of the algorithm are discussed here. A complete description may be found in *Data Encryption Standard* (*DES*), Federal Information Processing Standards, Publication 46-2, December 1993, which is incorporated by reference for all purposes as if fully set forth herein.

The encryption and decryption processes are almost identical except for using an altered schedule for addressing the bits in the key. Decryption may be accomplished only by using the same key as used for encryption. Both the encryption and decryption processes feature input and output block sizes of 64-bit words. The key size, in each case, is 56 bits, extracted from a 64-bit word.

DES properties include:
Uniqueness of ciphers for a given key—encryption of a set of input words with a different key produces a different set of ciphers;
Key secrecy (a basic condition for strong and reliable protection)—a given set of plain text with a corresponding cipher thereof, can theoretically need up to $2^{56}$ (i.e. ?72× $10^{15}$) searches to discover the correct key; and
Efficiency and simplicity—the DES algorithm is simple and easy to implement because it requires only basic calculations, like XOR operations, shifting numbers, and accessing small, pre-known tables.

CBC Operation Mode of DES

There are several operation modes for the DES algorithm. The present invention preferably uses only one of them, the cipher block chaining (CBC) mode. In this mode, each encryption operation depends on the immediately preceding block. Before a block is encrypted, it is XOR-ed with the encrypted version of the previous block. This mode is applicable when encryption a long data sequence into a single cipher word. The CBC operation mode is illustrated in FIG. 5.

A first block $B_1$, which consists of 64 bits, is encrypted using DES with a key, denoted by The resultant output, Cl, is XOR-ed ($\oplus$) with the next data block, $B_2$. The XOR-ed word is DES encrypted with key $K_2$, and so on. At the end of the process, a cipher block of 64 bits, $C_n$, is obtained.

LSB Coding

Consideration must be given to where and how, in a frame, a digital signature should be embedded. The Least Significant Bit (LSB) method takes a given binary number and overwrites its least significant bit with a single bit of signature data: 0 or 1. For example, the number eight is 1000 in binary notation; writing 1 into the LSB yields 1001 (=9) while writing 0 preserves the original value 1000 (=8). Extracting the embedded information is straightforward since the LSB carries an embedded bit without any distortions.

Depending upon the embedded value, embedding information in the LSB might involve loss of original information in the LSB. If the embedded bit has the same value as the LSB of the original number, no error is caused since the original value of the number is preserved; if the respective bits differ, then some original information is lost, irretrievably. Therefore, in general, there is no way of exactly reconstructing the original information.

The advantage of embedding in the LSB is that minimal error is caused thereby, as compared with embedding into more significant bits. Moreover, as the absolute value of an original number increases, the proportional error decreases. Therefore, it is preferable to embed into numbers of high absolute value rather than numbers with low absolute value. In practical terms, the visibility of a digital signature to the naked eye is reduced as the proportional error is reduced.

Summary

As seen above, various attempts have been made to embed signatures into digital video. There is thus a widely recognized need for, and it would be highly advantageous to have, a means of verifying the authenticity and integrity of digital media.

SUMMARY OF THE INVENTION

According to the present invention there is provided a method for verifying an authenticity and integrity of an ordered sequence of digital video frames, the video frames including respective data, the digital frames including Inter frames and Intra frames both including segments, the segments of the Inter frames including Inter segments and Intra segments, the segments of the Intra frames including Intra segments, the method including the steps of: (a) providing at least one secret key; and (b) protecting the sequence by embedding a respective calculated digital signature in at least one video frame to produce a protected sequence: (i) each calculated digital signature being dependent on the data of another video frame; and (ii) each calculated digital signature being generate using one secret key.

According to further features of the present invention, there is provided, in an ordered sequence of digital video frames, the sequence being compressed according to a video compression standard, the sequence including at least one Intra frame and the frames including segments, a method of predicting a plurality of highest-textured segments in a frame including the steps of (a) counting non-zero transform coefficients in each segment of one of the at least one Intra frame; and (b) selecting a plurality of segments having the highest counts of the transform coefficients.

According to still further features of the present invention, there is provided a method of protecting an authenticity and integrity of an ordered sequence of digital video frames, including the steps of: (a) compressing the frames according to a transform-based video compression standard; and (b) for at least one frame: (i) embedding bits of a digital signature in respective transform coefficients of the at least one frame, and (ii) prior to said embedding, predicting a number of mis-embeddings of the bits.

According to the present invention, there is provided an apparatus for embedding digital signatures into a sequence of digital video frames including: (a) a video encoder for compressing and encoding the input sequence to produce a compressed and encoded sequence; (b) a digital-signature-generation unit for generating a digital signature for embedding into the frames of the compressed and encoded sequence; (c) an embedding-pattern-generation unit for generating an embedding pattern; (d) a signature-embedding unit for embedding the digital signature into the frames of the compressed and encoded sequence according to the embedding pattern.

According to the present invention, there is provided an apparatus for authenticating and verifying respective embedded digital signatures in an input sequence of digital frames including: (a) a video decoder for decompressing and decoding the input sequence, thereby providing a decompressed and decoded sequence; (b) a stream-signature generation unit for calculating a digital signature for each frame of said decompressed and decoded sequence; (c) an embedding pattern generating unit for generating a respective embedding pattern for each frame of the decompressed and decoded sequence to point to a location, in each frame, of the respective embedded digital signature; (d) a frame signature extracting unit for extracting the respective embedded digital signature from each frame of the decompressed and decoded signature in accordance with the respective embedding pattern; and (e) an authenticity-verification unit for determining an authenticity and veracity of the decompressed and decoded sequence.

The present invention successfully addresses the shortcomings of the presently known configurations by providing a means of verifying the authenticity and the integrity of a recorded video sequence compressed according to a compression standard method, without having access to the original recording, without violating the standard, and still maintaining video quality. Any tampering with the video, whether in video content of any particular frame, or with frame order, or by insertion or deletion of a frame or frames is detectable by the method of the invention. The method enables these achievements and operates in real time. The method employs a high level of security.

The present invention discloses an innovative approach to the use of digital signatures for protecting the authenticity of individual video frames of a sequence by incorporating into the digital signatures both secret digital keys and the video information contained in the individual frames that are to be protected. By relating digital signatures to previous frames, the method also protects the integrity of the order of the sequence. Using the Data Encryption Standard for signature generation and decoding gives high sensitivity to tampering and ensures high reliability of authenticity verification.

Provision is made to include in the embedded signatures, information relating to environmental parameters, such as time and date of recording, recording channel number, and so on. This feature makes the invention useful in connection with legal proceedings wherein a recorded video sequence is tendered in evidence.

A particular feature of the present invention is that motion depicted in the frames is used to camouflage the embedded digital signatures and, importantly, when little or no motion is involved, an alternative innovation employs high-texture areas of the scene to achieve the same end. The outcome is that detection of the digital signatures is extremely difficult, even for those who are aware that the signatures are embedded.

A further innovation of the invention is of a simple method of determining high-texture areas utilizing a simple count of energized (i.e. non-zero) DCT coefficients instead of high-calculation intensive variance calculations thus saving time. A high-texture area is, to a good approximation, an area having a high count of energized coefficients.

The method of the present invention employs an innovative approach to embedding the digital signatures, dynamic embedding, that is applied in conjunction with embedding patterns and embedding criteria. This involves predicting suitable embedding locations before a particular frame is embedded so that the process is done in a single pass. Other methods require one pass to find suitable locations and a second pass to perform the embedding. Because the method works on a macroblock basis, it requires low memory resources. This results in a particular frame in a sequence being protected by information embedded in a succeeding frame.

The method is implementable on a digital signal processor and works with a standard video encoder and decoder.

Embedding takes place in the frequency domain, with due consideration of the human visual system. Utilizing compression parameters for hiding digital signatures improves system performance, which is reflected in high-quality video.

More specifically, the method of the present invention embeds bits of a digital signature in the coefficients of a Discrete Cosine Transform representation of each video frame of a video sequence. The particular coefficients to be embedded are selected to represent areas of the frame that will be most susceptible to camouflaging the embeddings and to meet further embedding criteria ensuring that the proportional error that the signature causes to the embedded coefficient is minimized, thereby further reducing the likelihood of detection or of having an adverse effect on video quality. For this reason, the embedding is done in the least-significant bit of an embedded DCT coefficient, to reduce the proportional error.

The embedding patterns that guide this process are predicted from preceding frames. The application of embedding criteria relating to minimum permitted magnitudes of DCT coefficients, motion vectors, and quantization levels (in the video encoding process) act to minimize embeddings in badly predicted coefficients. As a last resort, a default embedding pattern is provided that embeds in the bottom part of a frame, but its use is minimized to reduce the likelihood of signature detection.

Three types of embedding patterns are provided: the Inter pattern, for use in frames where there is motion; the Intra pattern, for use in frames where motion is insufficient to camouflage embedded signatures; and the Default pattern, for where the other two supply insufficient embedding locations. The first two embedding patterns are devised so as to select the best candidates for embedding.

Use of the Intra frame is indicated when it is predicted that there will be insufficient effective embeddings in the following Intra frame. An innovation of the method of the invention is a simple means of estimating when this will be the case and involves use of a linear formula having low calculation requirements.

During decoding, the method calculates anew from a digital frame a digital signature, using the same method and secret keys as were used in the original encoding, which it compares with a signature it extracts from the succeeding frame. Non-identity proves that a frame has been tampered with or inserted, deleted, or re-ordered. As with encoding, decoding employs a minimally modified standard decoder and the encrypted video sequence could be replayed on a standard decoder, though without being able to confirm thereby authenticity and integrity.

For both encoder and decoder, the components that augment a standard encoder and decoder are few and simple and, as mentioned, do not cause the recorded video sequence to violate the standard concerned.

The method is applicable to any transform-based video compression standard and, in the present invention, is illustrated by application to the H.263+ standard. Similarly, the method may be implemented using any suitable encryption algorithm and, in the present invention, is illustrated by use of the Data Encryption Standard (DES), in particular incorporating the Cipher Block Chaining (CBC) mode of the DES, although a less calculation-intensive variant is provided to reduce calculation and time needed.

In the H.263+ standard, encoding is done at the macroblock level and macroblocks are characterized as Inter macroblocks and Intra macroblocks respectively, according to whether there is motion from the corresponding macroblock in the previous frame or not. The present invention takes advantage of this distinction in determining whether or not embedding will occur.

Because of the chained character of the protection provided, proper attention is given to protecting the final frame of a sequence by providing for a dummy unprotected frame to be added to the end of the sequence.

BRIEF DESCRIPTIONS OF THE DRAWINGS

The invention is herein described, by way of example only, with reference to the accompanying drawings, wherein:

FIGS. 13A and 13B illustrate the process of signature embedding at the macroblock level;

DESCRIPTION OF THE PREFERRED EMBODIMENTS

Figure 1:
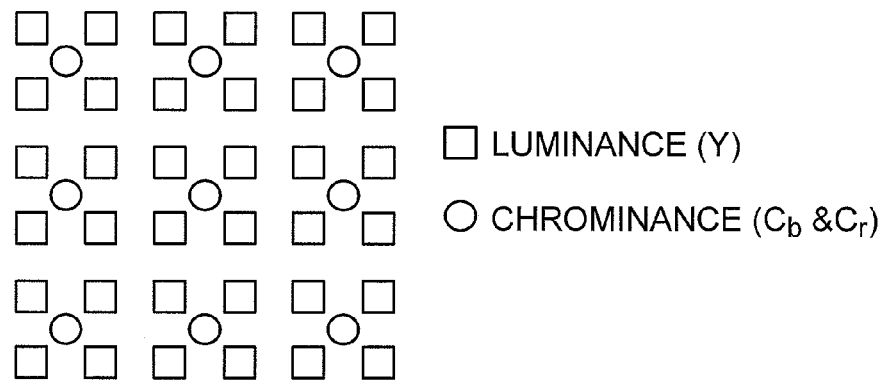
FIG. 1 shows the relative positioning of luminance and chrominance components in a sampled picture.

The present invention is of a method of verifying the authenticity and integrity of an ordered sequence of digital video frames. Integrity includes maintenance of frame order and non-deletion and non-insertion of frames while authenticity includes that the visual content of individual frames and details of the recording environment are as originally recorded. The invention works without having access to the original recorded data and with minimal added complexity to the recording and play-back processes.

Specifically, the present invention embeds a sequence of data-dependent digital signatures into at least some frames of a sequence of digital video frames and, later, checks the signatures extracted from the recorded media for internal consistency. The signature embedded in a particular frame depends upon a secret key and the data-content of another, normally the immediately preceding, frame, except for the first frame of a sequence, in which the embedded signature depends only on a secret key. The secret key may be chosen to include data chosen by the operator, as described later. Thus, the authenticity and integrity of a particular frame are verified by a digital signature extracted from another frame. In a preferred embodiment of the invention, a 64-bit digital signature is embedded into the succeeding frame of the sequence.

The method of the present invention uses an augmented standard video codec, without compromising the operation and structure thereof; the resultant data still complies with the video standard. Importantly, this is true on the decoder side so that the recorded media can be viewed on any standard decoder. The method works in a single-pass, i.e. each frame is processed once only as analysis and coding are done concurrently, and on the fly, i.e. processing occurs at least as fast as data is presented, and is flexible enough to be adjustable to suit available digital video processing power.

The principles and operation of the method according to the present invention may be better understood with reference to the drawings and the accompanying description, which illustrate specific embodiments of the current invention. It is to be understood that the descriptions below are illustrative, and are not intended to restrict the present invention to the specific details set forth below Requirements What needs to be verifiable includes:
Whether a given video sequence is as was recorded at a particular time and date, and
Whether a given video stream has been altered since being recorded, including modifying visual content or frame order.

An acceptable system will produce minimal visual effects that are indiscernible to the naked eye.

The method is preferably implementable on a digital signal processor (DSP) and is efficient enough to meet the constraint of real-time operation thereon, i.e. data is processed at least as fast as the rate of arrival, without delay. Another constraint is that the original data (sampled video) is unavailable to the decoder for comparison.

In a preferred embodiment of the present invention, the embedded video complies with the H.263+ video standard.

An acceptable authenticity verification system incorporates unique characteristics in the recorded data. To guard against tampering from the earliest possible moment, this external information, known as a digital signature, is embedded in the data during the compression process when the video stream is recorded. Verification is performed by checking the integrity of the digital signatures while playing back the data. Altering the media will produce modified or broken digital signatures.

Although the invention is described compatible with a video recording system such as the NICE-Vision® video recording system which performs compression of analog video channels and digitally saves the compressed data (H.263+ compliant) on disks, this should not be taken to limit applicability to other like systems.

Media Protection and Authentication

To provide a protection mechanism to identify whether a given digital video sequence has been tampered with, a unique digital signature is embedded therein during encoding. Subsequently, a decoder verifies the authenticity thereof by checking the integrity of the signature. It is a requirement that tampering cause the embedded signature to differ from the originally embedded signature.

Protection must be adequate to detect modifications of:
Visual information, such as changing RLC events in a bitstream;
Frame order within a sequence of video frames, including any occurrence of frame deletion or addition; and
Recorded environment parameters, including recording date, recording hour, and recording channel.

Also required are:
Minimal (negligible) effect on visual quality—in particular, indiscernibility to the human eye; and
Cryptographic strength—the chances of cracking a signature should be very low, such as is attainable by applying a cryptographic process using secret keys.

The above-specified requirements impose some constraints on the signature-generation process:
Visual Data Dependency:
The signature has to be sensitive to any attack against the video stream, i.e. the signature should break in case of media tampering. Therefore, signature generation must rely on the visual data contained in the media, itself. Using a data-dependent signature plays an important role in authenticity verification.
Protection Scheme:
Detection of frame-order modification within a video sequence implies that each frame therein must contain a unique embedded signature (although a weaker degree of protection may be afforded if not all frames are so embedded). This is easily supported by H.263+, the syntax whereof has a frame layer.
Amount of Embedded Information (Signature Size):
Embedding a video frame with a signature is tantamount to inserting noise into the video signal, since the signature is not part of the frame—the more embedded data, the greater the destruction of media quality and, at some point, a signature becomes detectable by the naked eye. On the other hand, requiring that the signature in each frame be unique mandates sufficient space for representing enough different code words.
Statistical Properties:
An important requirement is to make the signatures statistically independent since correlated signatures can otherwise be easily detected by simple statistical tools. For example, embedding a sequence of consecutive signatures into consecutive frames means that exposing one signature might lead to exposing the others; an extreme case is where consecutive signatures are identical. Using independent signatures makes an attack much more difficult.

Implementation of the Invention

The present invention includes two main modules:
Augmented Digital Video Encoder—62 in FIG. 6, which receives 60 and compresses 63 a sequence of digital frames, . . . i–l, i, l+1 . . . , into a digital bit-stream complying with a standard such as H.263+ or MPEG, and embeds 66 digital signatures $s_i$ into quantized DCT coefficients QDCT to produce a protected, compressed, digital video bit-stream 68; and Augmented Digital Video Decoder—82 in FIG. 8, which decodes a compressed digital video bit-stream 80 (e.g. H.263+ or MPEG) into a sequence of video frames 88, and verifies 87 the authenticity thereof.

The aim is to determine whether bit-stream 80 is identical with bit-stream 68.

Figure 6:
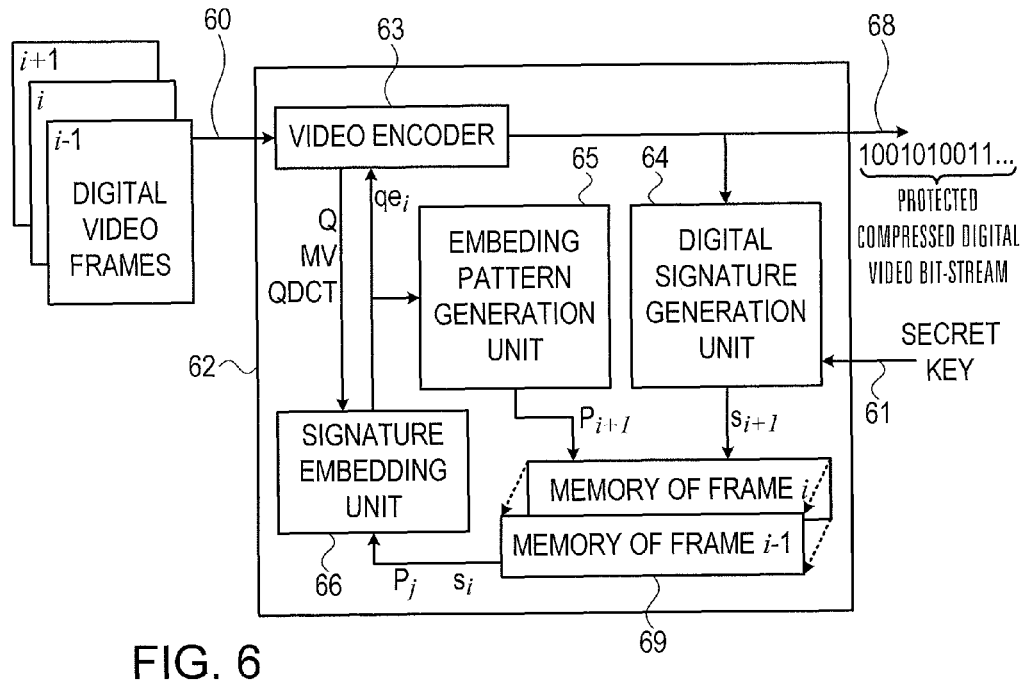
FIG. 6 is a schematic diagram of the augmented video encoder of the present invention.

In order to be able to verify the authenticity of an H.263+ video stream, augmented video encoder 62 embeds 66 a unique 64-bit digital signature $s_i$ in each frame i during encoding. The general block diagram of augmented encoder 62 presented in FIG. 6, shown processing frame i, incorporates the video encoder of FIG. 3A, shown as video encoder 63, and additional units: a digital-signature generation unit 64, an embedding-pattern generation unit 65, a signature embedding unit 66, and a temporary memory 69.

Figure 3A:
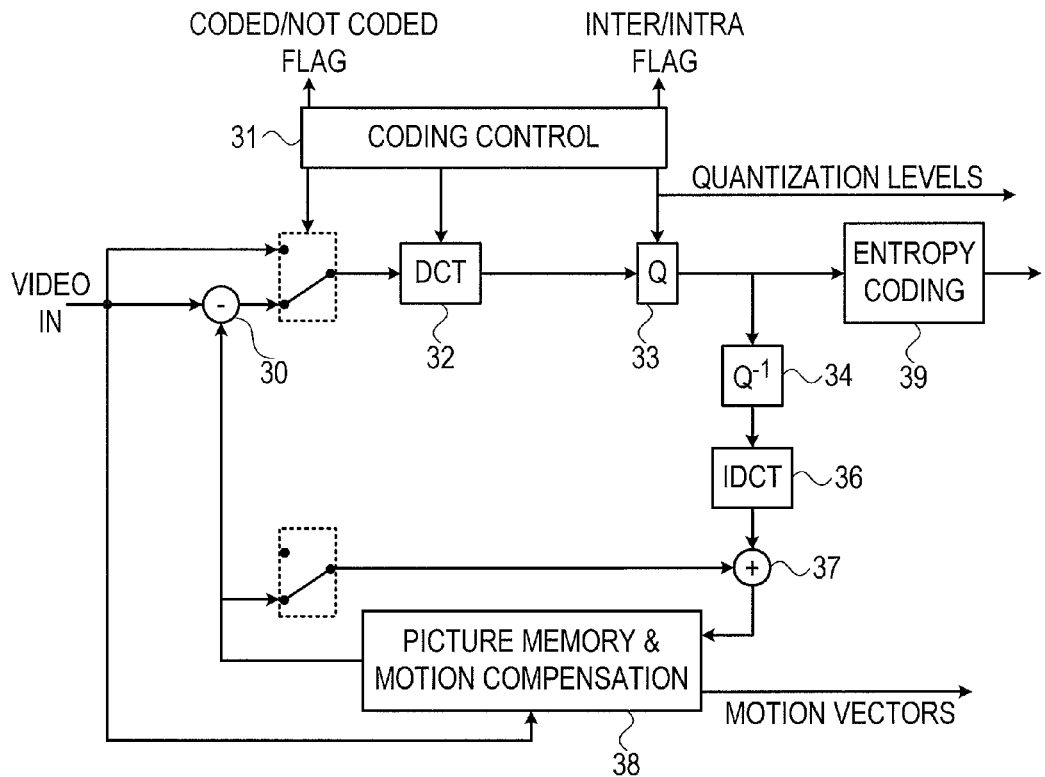
FIG. 3A is a block diagram representation of an H.263+ encoder
Figure 7:
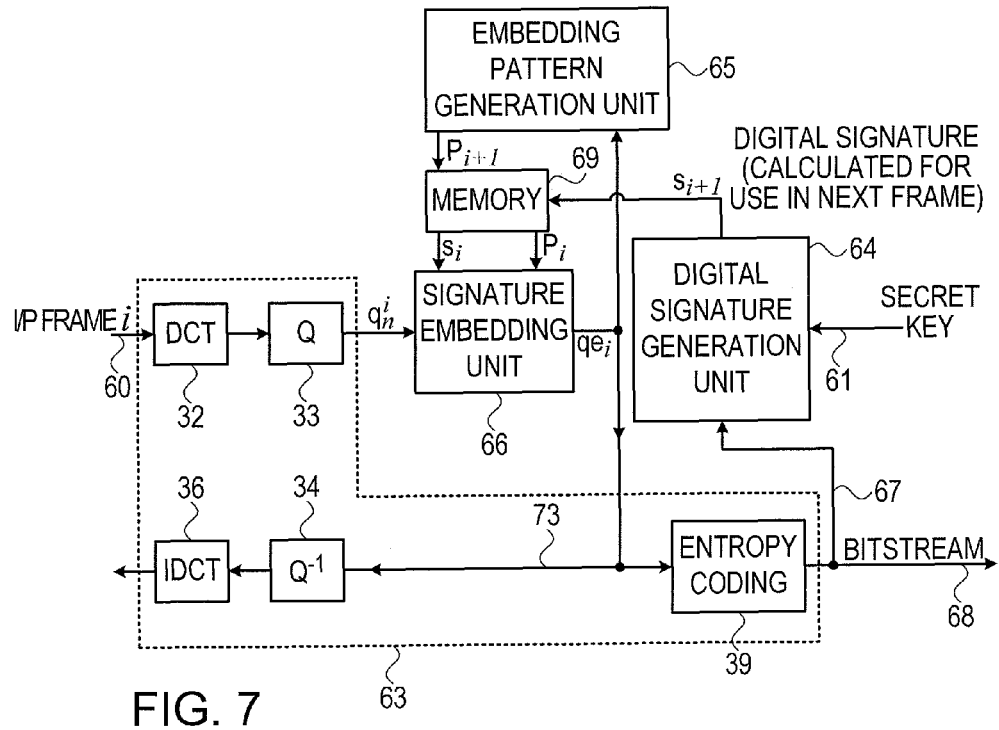
FIG. 7 shows partial detail of the augmented video encoder.
Figure 14:
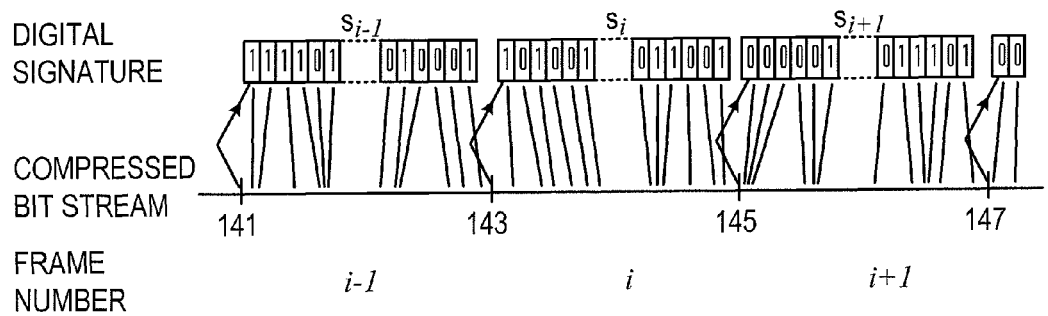
FIG. 14 shows how frame-dependent signatures are embedded, sequentially, in a succeeding frame.

Further detail of the additional units, as compared with FIG. 3A, is shown in FIG. 7 wherein part of FIG. 3A is redrawn (shown within a dotted boundary, Partial 63) and the relationship of the added components of the present invention depicted relative thereto The function of the additional components is to generate and embed a 64-bit digital signature in each video frame. For each video frame i, embedded signature $s_i$ is based on the compressed bit-stream of the immediately preceding video frame i–1, as illustrated in FIG. 14 wherein digital signature $s_i$ is shown, collected from the end of processing of frame i–1, and so on. Temporary memory 69 stores signature $s_i$ and is subsequently rewritten with signature $s_{i+1}$ and so on. Each digital signature $s_i$ is generated using the Data Encryption Standard (DES) crypto-engine, with a secret 64-bit key 61. The secrecy of key 61, which is known only to authorized persons (including both augmented video encoder 62 and augmented video decoder 82), is crucial to safeguarding the signature.

Figure 5:
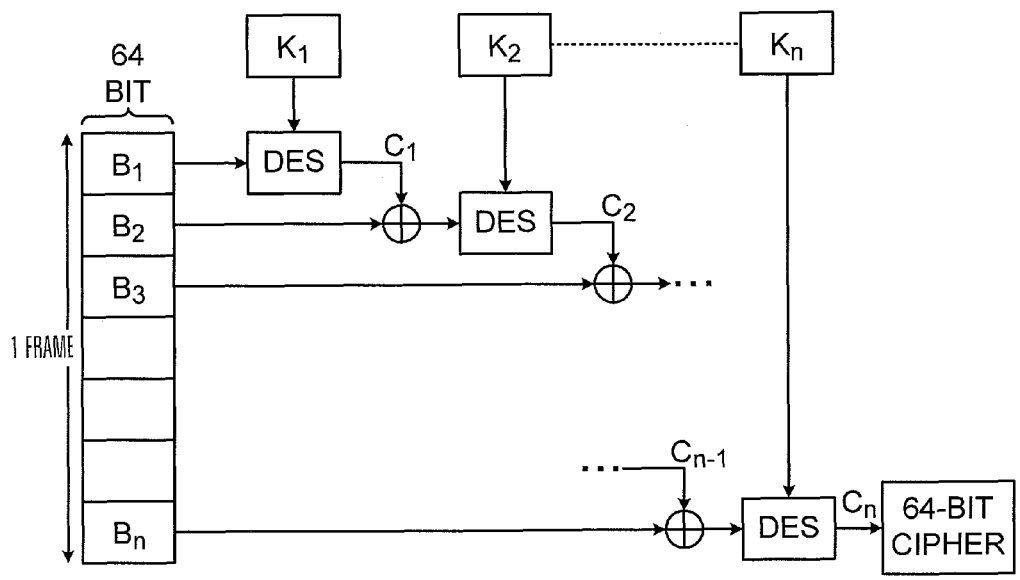
FIG. 5 shows the cipher block chaining (CBC) mode of the Data Encryption Standard.

A sampled video frame i, divided into macroblocks, is supplied 60 to augmented video encoder 62. 64-bit secret key data sequence 61 is input to digital-signature generation unit 64, which generates digital signature $s_i$ for LSB embedding into $q^i_n$ (the quantized DCT coefficients of frame i, n=1 to k, k being the number of coefficients in a frame). Digital-signature embedding unit 66 embeds the bits of digital signature $s_i$ in specific locations that are scattered over video frame i, according to an embedding pattern $p_i$, that specifies embedding locations and is produced by embedding-pattern generation unit 65 from the DCT coefficients of the previous frame. Embedding patterns are discussed below. A resultant embedded signal $qe_i$ (quantized embedded DCT coefficients $qe_n^i$ (n=1 to k) embedded with $s_i$) is fed-back (73) for use in a motion estimation and compensation stage 38 of immediately succeeding frame i+1, as is standard in H.263+ encoding. Signal $qe_i$ is also entropy encoded in an entropy encoding module 39 (which, in the present invention, is to be understood as including zig-zag scanning and variable-length coding, as included in the H263+ standard and described earlier) and output as bit-stream 68 as well as passed to digital signature generation unit 64 to generate signal-dependent digital signature $s_{i+1}$ to be embedded in succeeding frame i+1, in accordance with the CBC mode of the DES, as depicted in FIG. 5. It may be necessary to pad out the bit stream to be a multiple of 64 bits; preferably, in the present invention, zeroes are used for this purpose. Bit stream 68 is a protected, compressed, digital bit-stream 68, i.e. a digitally signed, H.263+ compressed video bit-stream.

In this manner, the entire visual medium is protected, since each bit of bit-stream 68 is encrypted according to secret key 61 and the DES standard, with the additional feature of strong dependency between successive frame visual data blocks to protect frame sequencing.

Digital Signatures

As already mentioned, there are many encryption algorithms. Although the present invention is described in terms of the DES standard, any other suitable algorithm could be used (such as 3DES).

Ideally, the full CBC operation mode of the DES crypto-engine, as described earlier, is used to obtain a 64-bit signature, as explained earlier. In practice, real-time constraints may require some modification of this process, and the present invention makes provision to do so. One possibility is to perform fewer DES operations per frame. The main disadvantage of decreasing the number of DES operations per frame is weaker protection than in an ideal configuration because XOR-ing different sequences of blocks can yield the same signature, thereby reducing the uniqueness thereof.

In order to maximize protection under such a limitation, a different key may be used for each DES operation, thereby increasing the number of possibilities for mapping the stream blocks into a single signature.

Figure 10:
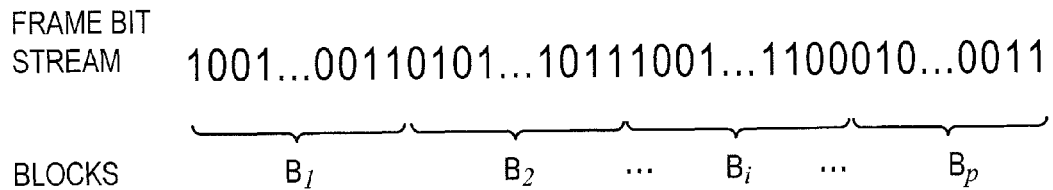
FIG. 10 represents the division of a bit stream into blocks.
Figure 11:
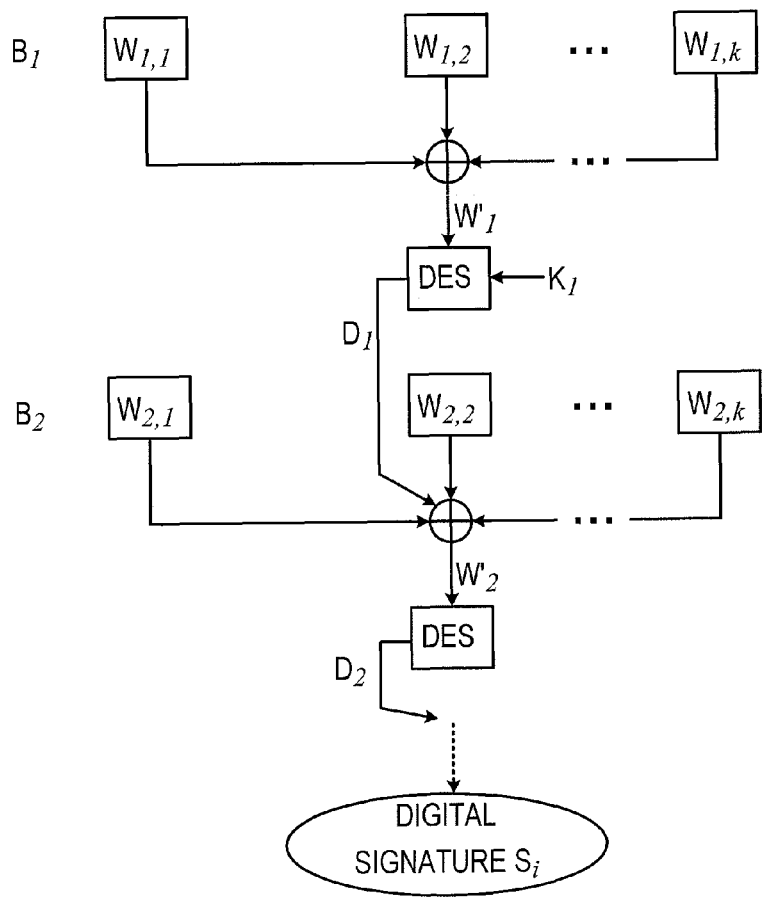
FIG. 11 shows how a digital signature is constructed for a sequence of frames in the DES.

In order to operate in real time in accordance with available digital video processing power, the amount of calculating can be reduced by using the following method, as illustrated in FIGS. 10 and 11. The bit stream of a single frame is divided by augmented video encoder 62 into a plurality p of equally sized blocks: $B_1, B_2, \ldots B_i, \ldots, B_p$.

Each block, $B_i$, $(1 \leq i \leq p)$, is regarded as a sequence of 64-bit length words:

$$W_{i,1}, W_{i,2}, \ldots, W_{i,k}.$$

Starting from $B_1$, each word is concatenated to the following word by an XOR operation in the following manner:

$$W'_1 = W_{1,1} \oplus W_{1,2} \oplus \ldots \oplus W_{1,k}$$

The next step is applying DES to $W'_1$, with a secret key, $K_1$:

$$D_1 = \text{DES}(K_1, W'_1).$$

The process continues in similar fashion, concatenating $D_1$ to $W_{2,1}$ in $B_2$, and so on, until 64-bit signature $s_i$ is obtained.

Secret Key

The secret key used under DES is a matter for choice by the operator of a system and must be protected to prevent unauthorized access to protected data. In the present invention, the secret key may be any number and may include data selected by the operator, especially identifying data, including time and date of recording, and channel number that may be necessary if a protected video sequence is to be tendered in evidence during legal proceedings.

Signature Embedding

The saved media to be protected is a compressed bit-stream representation of the original video sequence. The digital signature is generated over this bit-stream.

Figure 12:
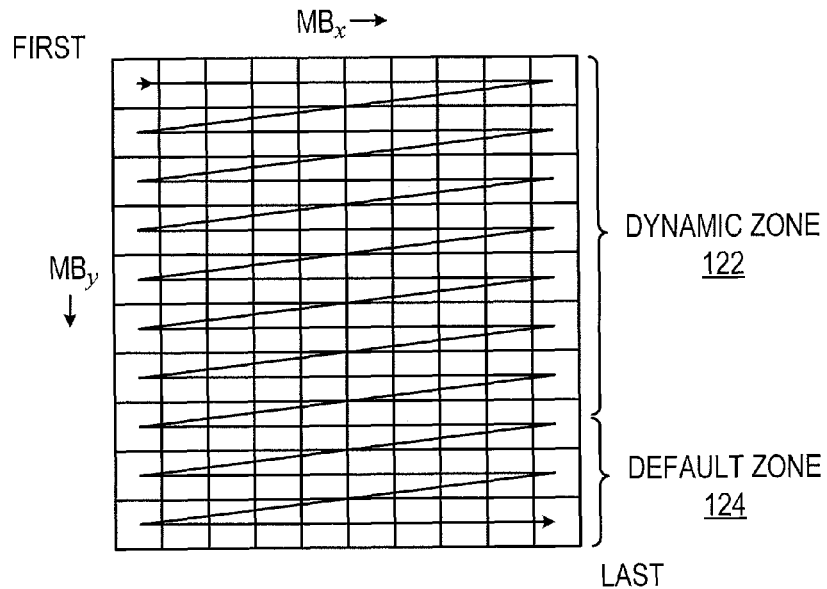
FIG. 12 shows the raster scanning order for signature embedding.

Macroblocks are encoded in raster-scan order, as depicted in FIG. 12. Augmented video encoder 62 encodes (DCT transform 32→quantization 33→entropy coding 39) each macroblock of each video frame i separately. The process starts in a dynamic zone 122 (a name given to the uppermost part of a frame i; a reserved area at the bottom of the frame i is a default zone 124, see FIG. 12) from an upper-left macroblock ('First' in FIG. 12), proceeds rightwards to an adjacent macroblock until the upper-right macroblock is reached, then moves to the leftmost macroblock in the second row of the frame, and so forth until the last macroblock at the right end of the last row of the frame.

The 64 bits of digital signature $s_i$ are embedded in the LSBs of 64 quantized DCT coefficients, one bit per coefficient. The DCT coefficients are a representation of digitized video frame i in the spatial-frequency domain. Selection of which 64 DCT coefficients to be embedded is an important feature of the present invention.

Detectability of signatures by the naked eye has to be avoided. Detectability stems from several causes, including:
  Bad prediction by a pre-determined embedding pattern—in many cases it is not possible to predict accurately where non-homogeneity will occur in a frame—bad prediction may lead to embedding in homogeneous blocks, such as background, which can easily reveal a digital signature; and
  Localization of the signature, i.e. concentration in a particular region or regions, which emphasizes the existence of a signature.

It is therefore preferable to minimize both bad prediction, by avoiding predetermined embedding patterns, and localization, by trying to spread signature bits over all of video frame i.

In selecting the 64 DCT coefficients to be embedded, the main requirement is that the signature be verifiable against the bit-stream, which contains the DCT coefficients of frame i.

The choice of particular DCT coefficients to be embedded involves consideration of the human visual system, with the result that:
  The 64 DCT coefficients having the highest absolute values (HDCT) in each frame are preferably embedded, thus minimizing the proportional error caused by the LSB coding, as already discussed;
  Only Y (luminance) data blocks are embedded as most of the energy contained in a video signal is found in luminance blocks, which therefore contain (on average) more HDCT coefficients than the $C_b$ and $C_r$ (chrominance) blocks;
  DC coefficients of Inter macroblocks are excluded from embedding because the human eye is more sensitive to low-frequency variation than to high-frequency variation and, since the DC coefficient carries the average value of the elements of a block, and since adjacent blocks usually have the same average value, embedding into a DC coefficient might cause an embedded block to be visible to the naked eye in comparison with neighboring blocks.

Embedding pattern $p_i$ includes a list of pointers to specific locations in video frame i that indicate potential embedding locations, subject to appropriate conditions (embedding criteria) which are discussed below. The pointers specify a macroblock number (range dependent on picture size), a block number within the macroblock (0→3), and a DCT coefficient number within the specified block (0→63).

For each macroblock in frame i, signature-embedding unit 66 searches for a pointer in $p_i$. In the case that that macroblock is indicated by $p_i$ a respective bit is copied from signature $s_i$ and embedded in the LSB of the quantized DCT coefficient pointed to by $p_i$, subject to the embedding criteria. This process is repeated until all 64 bits of signature $s_i$ are embedded.

Video Frame Types

A typical compressed video sequence contains successions of video frames that may each be represented as:

I-$P_1$-$P_2$-$P_3$-...-$P_n$, where I represents an Intra frame and the $P_i$ are Inter (or difference) frames, as described earlier. Because of the prediction process of the H.263+ encoder, which bases each P-frame on an immediately preceding frame, there is a possibility of growing cumulative errors as a succession progresses. To reduce this tendency, a particular video sequence may contain a plurality of successions, each beginning again with an Intra frame and known as an Intra cycle.

Embedding Patterns

Three types of embedding pattern are employed in the present invention:
  Inter embedding pattern—an embedding pattern that is derived from every Inter frame.
    An Inter embedding pattern is derived from the locations of the highest absolute valued DCT coefficients (HDCT) in frame i for application to succeeding frame i+1. Because Inter frames mainly carry coding of motion the HDCTs will correspond mainly to areas of greatest change between frames, where embedded bits will tend to be least visible.
    In the present invention, an Inter embedding pattern contains 150 pointers. The number of locations is greater than the 64 needed, to allow for unsuitability of some of the derived locations (i.e. non-compliance with the embedding criteria described below).
  Default embedding pattern—a fixed pattern, pre-defined and known to both encoder 62 and augmented decoder 82.
    In case the bottom of the dynamic zone 122 is reached and fewer than 64 coefficients have been embedded, the remaining embeddings take place in the DCT coefficients representing default zone 124.
    A default embedding pattern contains 64 pointers.
    Embeddings in default zone 124 are a case of localization, which has already been noted as undesirable. They are termed mis-embeddings to indicate the higher risk of detection of signature bits embedded therein and the present invention tries to reduce mis-embeddings as much as possible. This is the rationale for introducing the Intra embedding pattern.
  Intra embedding pattern—a pattern that is derived from every Intra frame.
    This is an important element of the present invention.
    The principle is to mask embedded signatures visually by hiding them in macroblocks of high texture level, i.e. areas of high spatial variance. High texture implies the associated DCT coefficients are large and, accordingly, embedded data will be proportionately small. Deriving an Intra embedding pattern requires finding the locations of the 64 highest-textured macroblocks. Such information is found only in Intra frames because Inter frames are a representation of frame-to-frame differences and high-texture regions are often invariant between frames.
    To derive an Intra embedding pattern, the homogeneity level of the texture of a given macroblock is determined, in terms of the luminance component (Y) only. Macroblock texture can be expressed by the variance thereof:

$$\sigma_i^2 = \frac{1}{16 \cdot 16}\left(\sum_{j=1}^{16 \cdot 16} \{P_{L,i}(j) - \overline{P}_i\}^2\right)$$

where $P_{L,i}(j)$ is the value of the luminance of the j-th pixel in the i-th macroblock, and $\overline{P}_i$ is the average of the luminance values in the macroblock:

$$\overline{P}_i = \frac{1}{16 \cdot 16}\left(\sum_{j=1}^{16 \cdot 16} P_{L,i}(j)\right)$$

The greater the macroblock variance, the greater is the texture of a particular macroblock. The amount of calculation required to determine a macroblock variance, however, is not small. Since this operation would have to be carried out in the decoder as well, it is not currently practicable to perform these calculations in real time.

In a preferred embodiment of the present invention, the 64 highest-textured macroblocks in an Intra frame are found by counting the number of non-zero DCT coefficients in each macroblock. This assumes a high correlation between the statistical variance of a macroblock and the number of energized (i.e. non-zero) DCT coefficients. Sorting macroblocks by the number of energized coefficients therein provides an Intra embedding pattern of 64 different macroblocks at the end of each Intra frame encoding. In practice, this approximation works very well and considerably reduces the number of calculations.

The more energized DCT coefficients in a macroblock, the higher is the probability that this macroblock carries high texture. In practice, these coefficients correspond to areas of spatial change in the original frame, such as edges, as opposed to uniform areas where an embedded bit is more likely to be Visible.

An Intra embedding pattern is applied only to Inter frames. The first Inter frame following an Intra frame is always embedded according to an Intra pattern.

An Intra embedding pattern contains 64 pointers (to accommodate 64 signature bits).

Embedding Pattern Management

Each embedding pattern is a list that points to locations of respective HDCT coefficients in a single frame i. A digital signature is embedded in the LSBs of the coefficients indicated by the embedding pattern.

An Inter pattern is sorted, by macroblocks, in raster scan order and saves the embedding prediction results from the latest frame. The current pattern is updated between two consecutive P-frame encodings.

An Intra pattern is sorted by macroblocks, in raster-scan order. The current pattern is updated from each I-frame.

A default embedding pattern is pre-defined and points to a default embedding zone. It is not updated.

Figure 2:
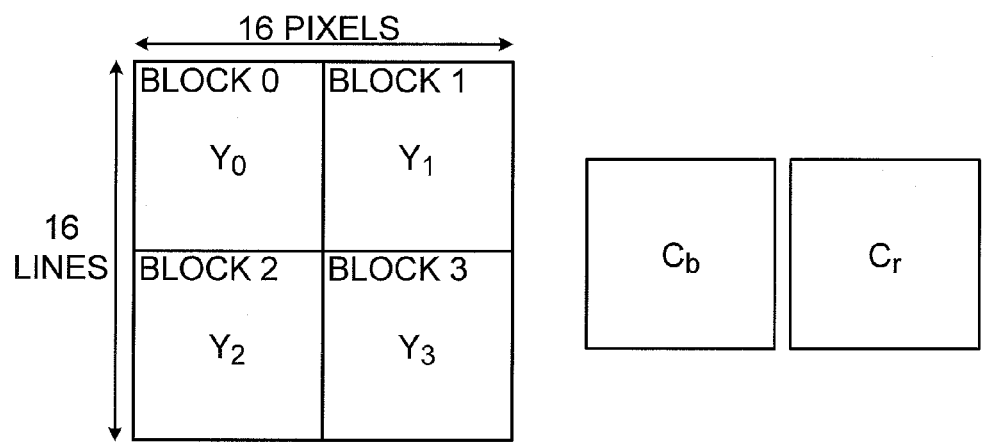
FIG. 2 depicts the arrangement of luminance and chrominance blocks in a macroblock.

Defining the exact location of an HDCT coefficient in a frame requires the following parameters:

- $MB_x$, $MB_y$ coordinates that point to the spatial location, in 2D coordinates, of a macroblock in frame i, as depicted in FIG. 12. Possible values of $MB_x$ and $MB_y$ depend on frame size.
- Block Number within a given macroblock, as shown in FIG. 2. Since only luminance blocks are used in the embedding process, this value ranges 0→3.
- Coefficient Number points to the location of a DCT coefficient in a given 8×8 block and so ranges 0→63.

Figure 15:
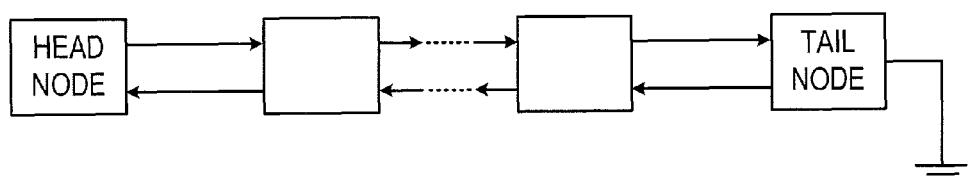
FIG. 15 illustrates a dynamic connected list.

The embedding pattern list is a dynamic connected list, as in FIG. 15, consisting of a string of nodes. The list is sorted by the absolute value of the HDCTs, the lowest value being kept in the head node of the list and the highest value in the tail node. The aim is that the head node contain a minimum threshold value. Updating the list is done only when a DCT with higher or equal absolute value is found. The list threshold might, therefore, grow while updating the list. When the list is updated, the lowest value node is eliminated and a new head node with a higher threshold results.

Each node in the list contains the following fields:
- $MB_x$ as defined above;
- $MB_y$ as defined above;
- Block Number as defined above;
- Coefficient Number as defined above;
- Coefficient Value—the DCT coefficient value;
- Previous Node Pointer—a pointer to the previous node in the connected list; and
- Next Node Pointer—a pointer to the next node in the connected list.

Embedding Criteria

Embedding patterns are applied in conjunction with a series of embedding criteria. The criteria determine which embedding pattern is used and modify the application of a pattern according to the actual conditions encountered and, thereby, take into account some of the problems caused by less-than-good prediction of embedding locations.

Application of the embedding patterns to the embedding process for a single macroblock may be understood from the following description and reference to FIG. 13. Application of the embedding criteria is indicated therein by criterion numbers shown as white numbers, 1→5, on black circles.

In the following, an Inter macroblock is one that has been predicted from a corresponding macroblock in the immediately preceding frame. An Intra macroblock has not been so predicted.

The additional compression parameters taken into account are:

The quantization level Q of the current encoded macroblock;

The norm $\|MV\|$ of the motion vector of the current macroblock, expressed in pixel units, defined by:

$$\|MV\|=|v_x|+|v_y|,$$

where $v_x$ and $v_y$ denote respectively the horizontal component and the vertical component of a motion vector, in full pixel units; and The value C of a DCT coefficient.

Embedding Criterion 1—Embedding in an Inter Macro Block in an Inter Frame

A DCT coefficient in the current frame that is pointed to by the Inter embedding pattern is embedded only if at least one of the following criteria is satisfied:

$$|C|>C_{min} \tag{a}$$

$$\|MV\|>MV_{min} \tag{b}$$

$$Q<Q_{max}. \tag{c}$$

Otherwise augmented encoder 62 skips to the next pointer in the embedding pattern, without embedding the indicated coefficient.

$C_{min}$, $MV_{min}$, and $Q_{max}$ are threshold values pre-determined by the user.

Note 1: Embedding a DCT coefficient with low quantization value, Q, produces low absolute error and thus low detectability by the naked eye because, in the inverse quantization process, DCT coefficients are multiplied by Q and, if Q is large, even the LSB will introduce a large error.

Note 2: The $\|MV\|$ parameter is a good estimate of the amount of motion in a macroblock. The visual quality of macroblocks with high $\|MV\|$ is probably low, due to motion-blur effects. Thus, embedding such macroblocks will be much less destructive than embedding macroblocks with less motion.

Embedding Criterion 2—Embedding in an Intra Macroblock in an Inter Frame

Scan every coefficient in the macroblock (including the DC coefficient):

If $|C|>C_{min}$—embed.

Embedding Criterion 3—Embedding in an Intra Macroblock in an Intra Frame

Embed the first 64 DC coefficients where:

$C>DC_{min}$ (a pre-determined threshold).

Note 1: An Intra frame contains only Infra macroblocks.

Note 2: Since DC coefficients in an Intra macroblock probably represent high energy, embedding such coefficients will produce a relatively low proportional error.

Embedding Criterion 4—Embedding by Intra Embedding Pattern

Embed coefficients pointed to by the Intra embedding pattern.

Embedding Criterion 5—Embedding by Default Embedding Pattern

Embed coefficients pointed to by the Default embedding pattern.

Linear Estimation of Mis-Embeddings

Ideally, an Inter frame will be embedded according to an Inter embedding pattern, as described. If, due to bad prediction or to a low level of motion, there are insufficient HDCTs in a particular Inter frame, embedding is done also according to an Intra embedding pattern, as a preferred fall-back option, in order to achieve 64 embeddings in each frame i, while still avoiding the undesirable option of embedding in default zone 124. That is, extra embedding locations are found from the Intra embedding pattern to supplement the Inter embedding pattern and reach the required number of 64 good embedding locations.

At the end of encoding each P-frame i, augmented video encoder 62 holds a list of potential locations for embedding in succeeding frame i+1. It is this feature that enables the method of the present invention to be performed in a single pass; i.e. each frame is processed once instead of, as in some other methods, being examined to find suitable embedding locations and processed a second time to do the embedding. In a preferred embodiment of the present invention, the list size is 150.

It might be that fewer than 150 DCT coefficients exceed a threshold, $C_{min}$, pre-determined to ensure the proportional error caused by embedding does not exceed an acceptable level. Coefficients not exceeding $C_{min}$ are termed non-effective predictions.

There is a strong inverse correlation between the amount of motion in a video clip and the number of mis-embeddings in each frame; in motionless sections, the number of mis-embeddings increases dramatically. The number thereof, M, is measured at the end of encoding each frame i and applied in frame i+1.

The number of mis-embeddings depends on the chosen $C_{min}$ threshold and motion content. Even decreasing the threshold to zero could still produce a large number of mis-embeddings. Thus, there is a trade-off between the rigidity of the embedding criteria and the number of mis-embeddings.

Incorporating the Intra embedding pattern into the encoding process poses a problem because, unlike default zone 124, which is a single group of successive macroblocks located at the end of frame i, the Intra embedding pattern indicates locations scattered all over frame i. Thus augumated encoder 62, must predict the mis-embeddings in advance (before encoding frame i), i.e. the number of DCT coefficients that should be taken from the Intra embedding pattern.

The solution of a preferred embodiment of the present invention is based on an estimate, as follows:

If $N_{i-1}$ is the number of non-effective predictions obtained at the end of encoding frame i-1, then the number of mis-embeddings in frame i, $M_i$, is estimated as:

$$M_i = \max[\min\{(N_{i-1}-k), S\}, 0]$$

where: $0 \leq k \leq E$,

E is the number of locations pointed to by the embedding pattern, and

S is the number of bits in the digital signature.

and the $M_i$ highest DCT coefficients are taken from the current Intra embedding pattern. This linear estimate is an approximation to a least-squares estimate that works well in practice.

In the embodiment described herein, E=150 and the equation resolves into:

$$M_i = \max[\min\{(N_{i-1}-75), 64\}, 0]$$

Frame-Level Control Flags

Figure 13B:
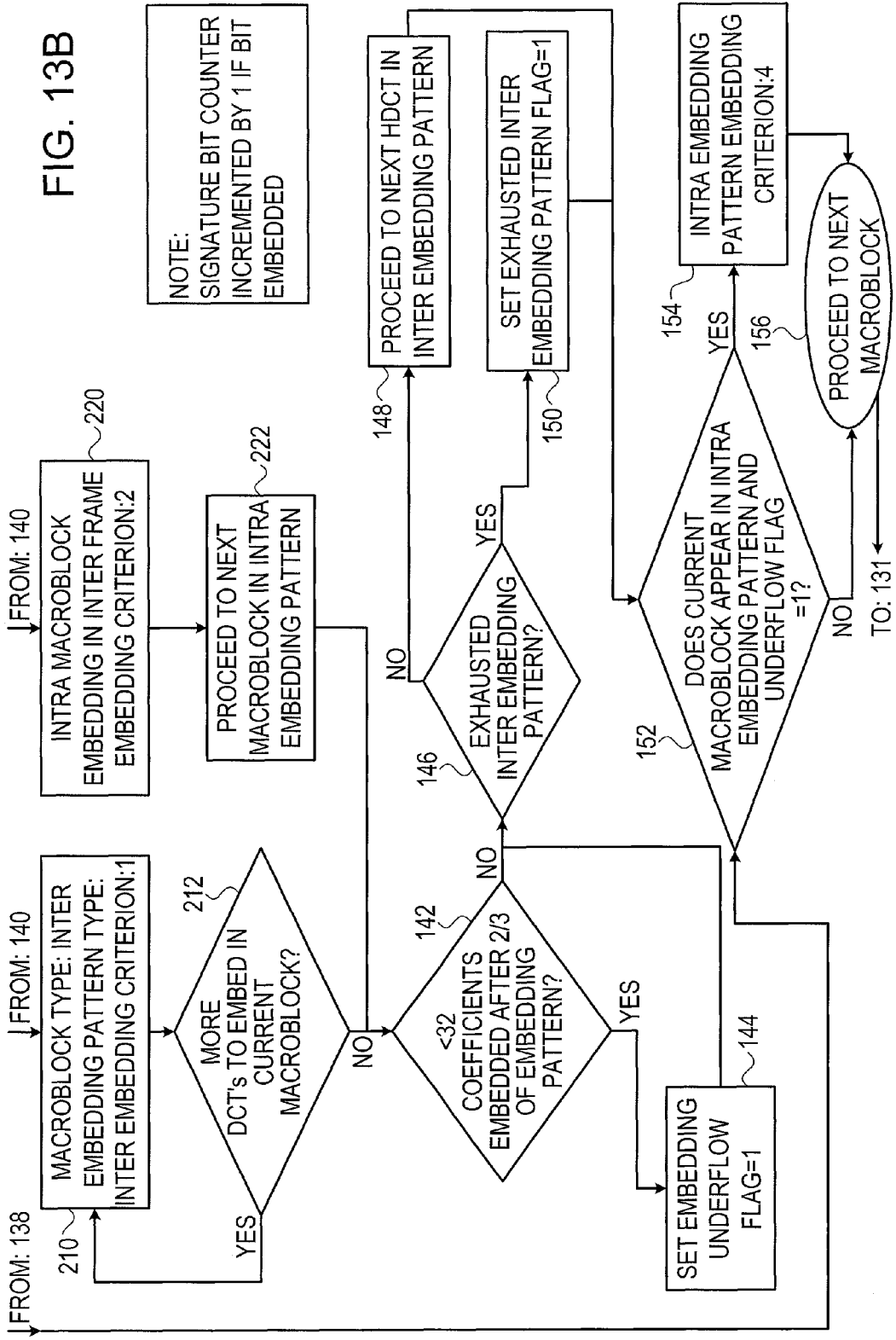

A further control is needed at the frame level to ensure that no more and no fewer than 64 signature bits are embedded per frame. This sets flags to denote:

Dynamic zone 130B—whether the current macroblock belongs to dynamic embedding zone 122 (where Intra and Inter embedding patterns are used) or to default embedding zone 124 (at the bottom of the frame, where a default embedding pattern is used)-tested at 136 in FIG. 13B;

Embedding underflow 130C—if ⅔ of Inter embedding pattern pointers have been used and fewer than 32 coefficients have been embedded, a flag is set to true (=1), whereafter further macroblocks are embedded according to an Intra embedding pattern—144 in FIG. 13B; and Exhausted Inter embedding pattern 130A—that there are no more valid pointers available in the Inter frame pattern—146 in FIG. 13B.

Signature Bit Embedding Process

The application of the embedding patterns in accordance with the embedding criteria is now discussed, with respect to a single macroblock of digital video frame i. The discussion will be understood in conjunction with FIGS. 13A and 13B in which like reference numerals refer to like procedures throughout the figures of the drawing.

Note that both augmented encoder 62 and augmented decoder 82 carry out the same processes in this regard using the same functions and environment variables. The only difference is that augmented decoder 82 extracts a signature whereas augmented encoder 62 embeds a signature. The description will be from the viewpoint of encoder 62; the decoder aspect may be easily inferred.

Referring now to FIGS. 13A and 13B, when digital video frame i arrives at augmented encoder 62, frame-level control flags, 130A, 130B, 130C, and 130D are initialized, as shown at 130. Henceforth, until frame i is completed, processing is done at macroblock level within frame i, starting at 131.

Macroblocks of frame i are processed in raster-scan order, starting from $MB_x=0$ and $MB_y=0$, proceeding in order of increasing $MB_x$ until a maximum value of $MB_x$ is reached and then continuing with $MB_x=0$ and $MB_y=1$ and so on, as shown in FIG. 12.

It is first determined, 132, whether frame i is an Inter frame or an Intra frame. This information is determined by the H.26+ encoder.

Intra Frame Embedding

If frame i is an Intra frame, then Embedding Criterion 3 is applied whereby a signature bit is embedded in the first 64 DC coefficients where $C > DC_{min}$ (230 in FIG. 13), provided that these coefficients are in dynamic zone 122, checked at 235. If in default zone 124, further embedding is continued according to a default embedding pattern 250 and Embedding Criterion 5.

Inter Frame Embedding

If frame i is an Inter frame, then further processing depends upon whether i is a first Inter frame in an Intra cycle, i.e. whether i immediately follows an Intra frame, 134, in which case an Intra embedding pattern is applied in accordance with Embedding Criterion 4, 240 in FIG. 13.

For subsequent Inter frames in an Intra cycle, the method of the present invention determines, 136, whether the current macroblock is located in dynamic embedding zone 122 or in default embedding zone 124.

If in default embedding zone 124, a default embedding pattern is employed in accordance with Embedding Criterion 5, 250, until the current macroblock is exhausted of DCTs to be embedded, 252, whereupon the next macroblock is processed, 256, until all 64 signature bits have been embedded.

If in dynamic embedding zone 122, a check is performed, 138, if the Inter embedding pattern has been exhausted.

If exhausted, a further test is done, 152, to determine if:
  The current macroblock is indicated by an Intra embedding pattern; and
  Embedding underflow 130C is set to 1.
If not, processing proceeds with the next macroblock, 156. Otherwise, the current Intra embedding pattern is used according to Embedding Criterion 4, 154, and processing proceeds with the next macroblock, 156.

If the test performed at 138 shows that the current Inter embedding pattern has not been exhausted, the current macroblock is tested, 140, as to whether it is an Inter or an Intra macroblock.
  If an Inter macroblock, an Inter embedding pattern is used, 210, where applicable, according to Embedding Criterion 1 for all DCTs in the current macroblock, 212.
  If an Intra macroblock, an Intra macroblock embedding is done according to Embedding Criterion 2, 220, and proceeds to the next macroblock in the Inter embedding pattern, 222.
In both preceding cases, a check is next performed, 142, whether fewer than 32 coefficients have been embedded after two-thirds of the embedding pattern has been exhausted. If so, underflow flag 130C is set to value=1, 144. (Both 32 and two-thirds are reasonable values for this purpose and are used for the sake of explanation. They may be adjusted in the light of experience.)

A subsequent test checks whether the Inter embedding pattern has been exhausted. If so, Exhausted Inter Embedding Flag, 130A, is set=1, 150. If not, processing proceeds to the next HDCT indicated in the Inter Embedding pattern, 148.

Subsequently is tested at 152 if the current macroblock appears in an Inter embedding pattern and underflow flag 130C=1. If not, the process continues to the next macroblock, 156. Otherwise, an Intra embedding pattern is applied according to Embedding Rule 4, 154, and processing continues to next macroblock, 156.

Sealing Protection

In the process as described, each frame is authenticated and verified by checking the digital signature in another frame. In the preferred embodiment, this other frame is the immediately succeeding frame.

The problem of authenticating and verifying the last frame of a sequence needs to be addressed.
  There are several possible solutions, including:
  a) Leave the final frame unprotected—this is a viable solution if it is known that the final frame is unprotected; and
  b) Add a final, dummy frame to the sequence to be protected, e.g. by repeating the final frame—this still leaves a final, unprotected frame which is not, however, crucial to the protected sequence.

Locating the LSB Coding Block-Function in the Augmented Encoder

The stage at which LSB coding is performed in the augmented encoder has significant effects on system performance, as well as on the visual quality of an embedded video. Two main considerations influence this:
  Preserving the compatibility between the augmented encoder and the augmented decoder.
    Encoder 63 contains an 'intrinsic decoder' that performs inverse quantization 34 and inverse DCT transformation 36. The same process takes place in the decoder 81 during decoding. For accurate reconstruction, the inverse quantization function must dequantize the same DCT coefficients in both encoder and decoder, otherwise an error will occur.
  Signature embedding causes loss of information when applying LSB embedding.
    Since quantization is a lossy operation, it is preferable to locate signature embedding unit 66 immediately after quantization unit 33, otherwise some embedded signature bits might be nullified by subsequent quantization, as already explained, with a consequent inability to extract the signature properly.

Decoding and Digital Signature Authentication

Figure 8:
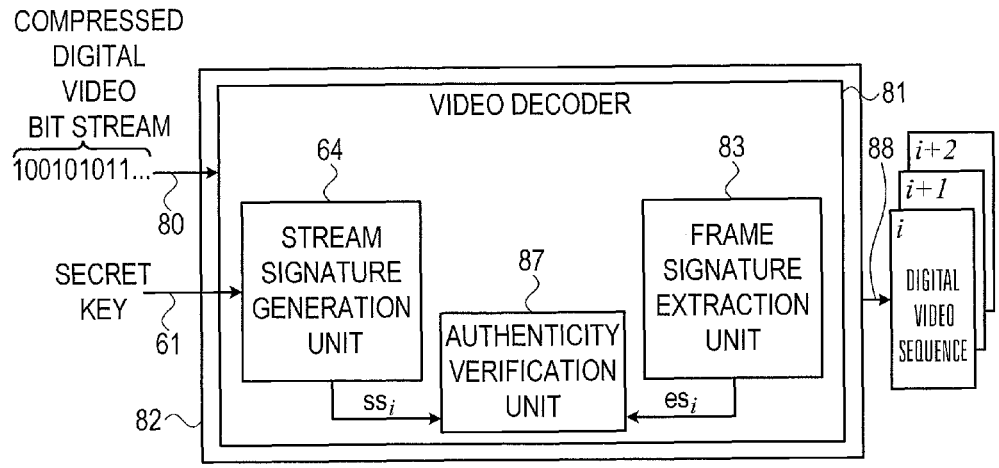
FIG. 8 is a schematic diagram of the augmented video decoder of the present invention.

During playback, augmented video decoder 82 verifies the authenticity 87 of the video clip by extracting 83 and authenticating the digital signatures embedded in each frame during the encoding process against stream signatures which are generated 64 in the augmented decoder by applying the same signature-generation process to the input bit stream as the encoder originally used. The major elements of the process are illustrated in FIG. 8 wherein:
  $es_i$ is a Frame Signature that is embedded in the DCT coefficients of the $i^{th}$ frame in video bit-stream 80; and
  $ss_i$ is a Stream Signature that is calculated by applying the encryption process to the bit-stream of the $i-1^{th}$ frame of video sequence 80, the same signature generation process 64 as was applied in augmented video encoder 62 to digital video bit-stream 68.

It is seen that augmented decoder 82 has a 'passive' role in obtaining frame signature $es_i$ and an 'active' role in calculating stream signature $ss_i$.

Figure 3B:
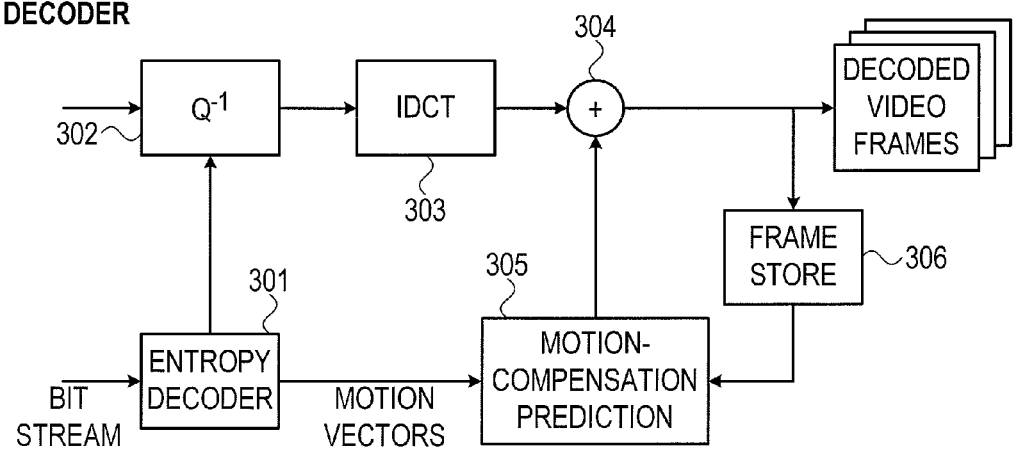
FIG. 3B is a block diagram representation of an H.263+ decoder.
Figure 4:
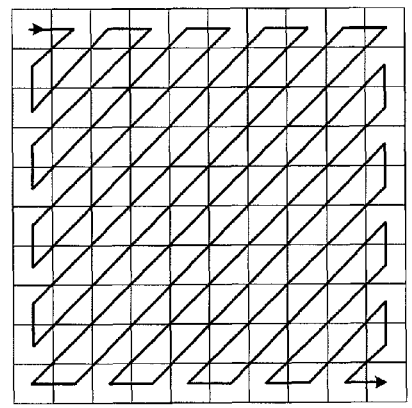
FIG. 4 represents the zig-zag order of block scanning.
Figure 9:
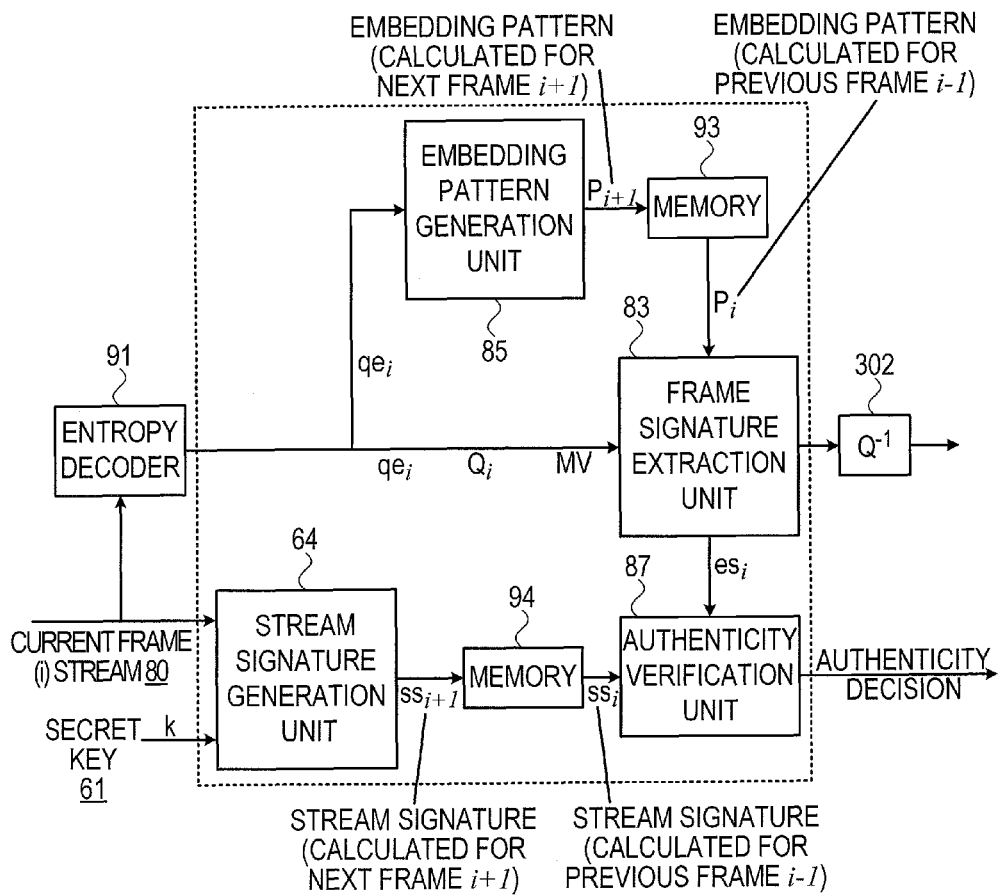
FIG. 9 shows partial detail of the augmented video decoder.

Partial detail of augmented video decoder 82 is shown in FIG. 9 wherein dotted box 90, interposed between an entropy decoding module 91 and an inverse quantizer module 302 of a standard digital video decoder 81, encloses the units that handle signature extraction and authenticity verification. The units that are not shown are identical to the respective units of a standard H.263+ decoder, as depicted in FIG. 3. FIG. 9 shows the processing of frame i.

The decoding process is done in the same way as in a standard H.263+ decoder 81.

Given an embedding pattern $p_i$ (calculated in Embedding Pattern Generation Unit 85 from frame i−1 by the same procedure used by augmented encoder 62 and stored from the time of that calculation in a temporary memory 93, which is subsequently written over by $p_{i+1}$ calculated from frame i for use with frame i+1) that points to different locations in a specific frame, augmented decoder 82 extracts $es_i$ from the coefficients indicated by $p_i$.

The calculation of $ss_i$ is done by applying the DES encryption process to the bit-stream of previous frame i−1 and $ss_i$ is stored in a temporary memory 94. During processing of frame i, the same process is employed and resultant stream signature $ss_{i+1}$ overwrites memory 94 for use with subsequent frame i+1. The reason for encrypting the bit-stream of previous frame is that augmented encoder 62 embeds signature $s_i$ built from previous frame into current frame i. For this process, augmented decoder 82 is supplied with 64-bit secret keys $K_1$, $K_2$, etc, the same as used by augmented encoder 62. Augmented decoder 82 compares signatures $es_i$ and $ss_i$.

If no tampering has occurred, then bit-stream 80 will be identical to bit stream 68 that was produced by augmented encoder 62 and, in augmented decoder 82, stream signature $ss_i$ and extracted signature $es_i$ will be found to be identical, wherefrom can be concluded that bit-stream 80 is authentic. If, however, bit-stream 80 has been tampered with, stream signature $ss_i$ will differ from extracted signature $es_i$.

While the invention has been described with respect to a limited number of embodiments, it will be appreciated that many variations, modifications and other applications of the invention may be made.

What is claimed is:

1. A method for verifying an authenticity and integrity of an ordered sequence of digital video frames, the method comprising:
    providing one or more secret keys;
    generating digital signatures; and
    protecting the sequence to produce a protected sequence by embedding in each of at least a portion of the video frames a respective one of said digital signatures according to an embedding pattern, wherein the respective digital signature being dependent on at least one of said one or more secret keys and data of another video frame,
    wherein generating and embedding the digital signatures is performed during encoding in a single pass.

2. The method of claim 1 wherein said digital signatures are dependent on record-environment parameters including time and date of recording and recording channel number.

3. The method of claim 1 wherein said embedding pattern is data dependent.

4. The method of claim 1 further comprising compressing the sequence of said digital video frames into a bit stream according to a video compression method.

5. The method of claim 4, wherein the respective digital signature is embedded in an associated transform coefficient, said associated transform coefficient being pointed to by said embedding pattern.

6. The method of claim 4, wherein embedding is performed if data dependent embedding criteria are satisfied.

7. The method of claim 6, wherein said embedding criteria are selected from a group of conditions such that a visual degradation of the video frames is minimized.

8. The method of claim 7, wherein said group of conditions includes i) absolute value of an associated transform coefficient exceeds a first predetermined value; ii) an associated motion vector exceeds a second predetermined value; and iii) an associated quantization be at most as great as a third predetermined value.

9. The method of claim 1 wherein said digital signature is generated using an encryption algorithm.

10. The method of claim 1 further comprising confirming an authenticity and integrity of said protected sequence, wherein said confirming comprises:
    extracting a digital signature associated with a particular frame from said protected sequence to obtain an extracted digital signature;
    calculating a new digital signature for the particular frame; and
    inferring authenticity and integrity by comparing said extracted digital signature with said new digital signature.

11. The method of claim 9, wherein said new digital signature depends on data of another video frame.

\* \* \* \* \*